(12) United States Patent
Itoh et al.

(10) Patent No.: US 6,209,311 B1
(45) Date of Patent: Apr. 3, 2001

(54) TURBOFAN ENGINE INCLUDING FANS WITH REDUCED SPEED

(75) Inventors: Takahiko Itoh, Yokohama; Hideo Takeda, Tokyo, both of (JP)

(73) Assignee: Nikkiso Company, Ltd., Tokyo (JP)

( * ) Notice: Subject to any disclaimer, the term of this patent is extended or adjusted under 35 U.S.C. 154(b) by 0 days.

(21) Appl. No.: 09/470,028

(22) Filed: Dec. 22, 1999

Related U.S. Application Data (63) Continuation-in-part of application No. 09/131,856, filed on Aug. 10, 1998.

(30) Foreign Application Priority Data

Apr. 13, 1998 (JP) .................................................. 10-120104
Apr. 9, 1999 (JP) .................................................. 11-103179

(51) Int. Cl.⁷ ..................................................... F02K 3/02
(52) U.S. Cl. ..................................... 60/226.3; 60/39.183
(58) Field of Search ............................ 60/39.183, 226.1, 60/226.3

(56) References Cited

U.S. PATENT DOCUMENTS 3,486,328 * 12/1969 Boudigues .................... 60/39.183 X
3,620,021   11/1971 Lawrie .
3,673,802 *  7/1972 Krebs et al. ............................. 60/226
3,678,690 *  7/1972 Shohet et al. ........................ 60/226.3
3,729,957 *  5/1973 Petrie et al. ........................ 60/226 R
3,861,139 *  1/1975 Jones .................................... 60/226 R
4,051,671   10/1977 Brewer .
4,055,042 * 10/1977 Colley ................................ 60/226 R
4,791,783   12/1988 Neitzel .
4,809,498    3/1989 Giffin, III et al. .
5,305,600 *  4/1994 Brossier et al. ..................... 60/226.3
5,311,736    5/1994 Lardellier .

FOREIGN PATENT DOCUMENTS 0 273 527 A2   7/1988 (EP) .
1 321 657      6/1973 (GB) .
1 330 904      9/1973 (GB) .

* cited by examiner

Primary Examiner—Timothy S. Thorpe
Assistant Examiner—Ehud Gartenberg
(74) Attorney, Agent, or Firm—Oliff & Berridge, PLC (57) ABSTRACT

An impeller is directly driven by an output shaft of a core engine. The airflow produced by the impeller rotates an air turbine and a fan disposed integrally with the air turbine. The impeller and the air turbine form a fluid coupling which serves also as a speed reducing mechanism. The rotational speed of the fan can be reduced to be lower than that of the output shaft while retaining efficiency of the core engine. The outer diameter of the fan can be increased, raising a bypass ratio.

4 Claims, 13 Drawing Sheets

TURBOFAN ENGINE INCLUDING FANS WITH REDUCED SPEED

This is a Continuation-in-Part of application Ser. No. 09/131,856 filed Aug. 10, 1998. The entire disclosure of the prior application is hereby incorporated by reference herein in its entirety.

BACKGROUND OF THE INVENTION

1. Field of the Invention

The present invention relates to turbofan engines commonly used in aircraft travelling at subsonic speeds, and more particularly to a mechanism for reducing fan rotational speed.

2. Description of the Related Arts

Turbofan engines have been widely used for aircraft travelling at subsonic speeds. In turbofan engines, propulsive force is gained by an exhaust stream, i.e. a jet, of a core engine in the form of a gas turbine engine and a fan driven by shaft power of the core engine.

In such a turbofan engine, the specific fuel consumption can be reduced by increasing the bypass ratio, that is, the ratio of the flow rate of the air directed downstream by the fan but bypassing the core engine to be discharged to the flow rate of air taken into the core engine. That is, higher efficiency can be obtained by increasing the propulsive force by the fan relative to the propulsive force by the jet.

A greater bypass ratio can be obtained by increasing the outer diameter of a fan. However, as the outer diameter of the fan increases, the peripheral speed of the fan increases and shock waves are produced when the speed approaches that of sound. This results in a lowering of the propeller efficiency of the fan, which in turn leads to a decline in overall efficiency. Therefore, rotational speed of the fan must be decreased in order to increase the bypass ratio. If the rotational speed of the fan is simply lowered, the rotational speed of the turbine in the core engine which directly drives the fan is also lowered, resulting in a decrease in turbine efficiency. Consequently, thermal efficiency of the core engine is also declined, thereby decreasing the overall efficiency.

A technique has been proposed to use a gear mechanism to reduce the rotational speed of the rotation shaft of the core engine and rotate the fan at a reduced speed. This technique makes it possible to obtain appropriate rotational speeds of both fan and turbine. For aircraft application, such speed reducing mechanism is required to be extremely lightweight and highly reliable.

Material for the gear mechanism is relatively heavy because of durability requirements. If its weight is reduced, rigidity of the gear mechanism will be diminished, giving rise to great deflection of components. Such deflection makes it extremely difficult to accurately obtain the engaging positions of the gear teeth, and therefore it is almost impossible to accurately know the dynamic stress at the components of the gear mechanism. Thus, the gear mechanisms currently available do not simultaneously meet requirements for reduction in weight and for high reliability.

Further, the fan and the turbine of the core engine produce thrust in the opposite directions. Therefore, if a gear mechanism as described above is provided between the fan and the turbine, these thrusts are not cancelled and a thrust bearing with great capacity is necessary, which further increases the total weight. If such a gear mechanism is not provided, the turbine and the fan are provided on a common shaft, substantially canceling the thrust powers, and only a small thrust bearing is required.

From the reasons above, application of the above gear mechanism to aircraft is limited to small engines; its application to large-scale engines has yet to be practically implemented. In addition, no appropriate speed reducing mechanisms other than such a gear mechanism have either been implemented or proposed.

SUMMARY OF THE INVENTION

The present invention was conceived in view of the above situation and provides a technique for reducing the speed of a lightweight and highly reliable fan in a turbofan engine. According to the present invention, a high bypass ratio can be obtained without an associated decline in propeller and turbine efficiencies, so that specific fuel consumption can be reduced.

The turbofan engine according to the present invention includes a core engine in the form of a gas turbine engine, at least one impeller driven by at least one shaft of the core engine and producing an airflow, at least one air turbine receiving the airflow of the impeller and thereby rotating at a slower speed than the impeller, and at least one fan rotated by the air turbine and producing an airflow, which generates propulsive force. A pair of the impeller and air turbine forms a speed reducing mechanism. Thus, rotation of the core engine shaft can be transmitted to the fan at a reduced speed. Since the fan rotates at a reduced speed, the outer diameter of the fan can be increased, and a high bypass ratio can thereby be achieved.

The impeller, the air turbine, and the fan have the same rotation axis. The fan is disposed outside the air turbine to rotate integrally therewith. A cylindrical flow splitter may at least also be provided at the boundary between the fan and the air turbine and either, or both, upstream or downstream of the boundary, and divides the airflow through the impeller and the air turbine and the airflow through the fan. By thus providing the flow splitter, the airflows passing through the impeller and the air turbine and through the fan do not interfere with each other, enhancing their respective efficiencies.

Either, or both, impellers or air turbines may be disposed in plural in the axial direction, so as to increase the torque to drive the fan and to conversely decrease the outer diameters of the impeller and the air turbine, leading to an increase in cross sectional area of the fan and therefore in the propulsion force provided thereby.

The fans may be disposed in a pair in the axial direction which rotate in directions opposite to each other, serving as so-called contra-rotating fans. The propeller efficiency of the fans can be improved by changing a swirling flow produced by the fan in a preceding stage into an axial flow by the fan in a succeeding stage.

The speed reducing mechanism formed by the fan, the impeller, and the air turbine may be provided either upstream or downstream of the core engine.

A turbofan engine according to another embodiment of the present invention includes a core engine in the form of a gas turbine engine, and a fan rotated via a speed reducing mechanism by at least one shaft of the core engine and producing an airflow, which generates propulsion force. The speed reducing mechanism has at least one impeller rotating integrally with at least one shaft of the core engine to produce an airflow, and an air turbine rotated by the airflow produced by the impeller and rotating the fan.

A turbofan engine according to another aspect of the present invention includes: a high-pressure turbine rotated by combusted gas discharged from a combustion chamber; a low-pressure turbine rotated by combusted gas discharged from the high-pressure turbine; a high-pressure compressor having a first shaft common with, and driven by, the high-pressure turbine for supplying compressed air into the combustion chamber; a low-pressure compressor having a second shaft common with the low-pressure turbine for compressing air supplied from the upstream of the engine to be discharged downstream; an air turbine receiving the airflow discharged from the low-pressure compressor to cause rotation; a flow splitter supported to the air turbine rotatably around the axis of the engine; and a fan disposed on the outer peripheral side of the flow splitter for rotating integrally with the air turbine to produce propulsive force. At least a portion of the airflow channeled through the air turbine is directed to the high-pressure compressor, and the part of the air turbine directing the airflow to the compressor forms the last stage of the low-pressure compressor.

According to this aspect of the invention, the rotational speed of the fan can be reduced relative to that of the shaft of the low-pressure compressor by properly setting the blade profiles of the low-pressure compressor, the air turbine, the fan, and the like. Such reduction in speed contributes to an increase in the outer diameter of the fan, and to a higher bypass ratio.

The low-pressure compressor may include a blade rotating with the second shaft, and a passive blade rotating with the flow splitter.

The turbofan engine may include an expansion turbine for receiving a portion of the airflow past the air turbine to rotate the flow splitter. The airflow channeled through the expansion turbine is a portion of the airflow directed from the low-pressure compressor, but is a bypass flow because it does not flow through the combustion chamber. Therefore, a higher bypass ratio can be obtained.

In the above turbofan engine, the airflow passing through an inner part of the air turbine may be directed to the high-pressure compressor, and the airflow through an outer part thereof may be directed to the expansion turbine. An air turbine splitter may be disposed at the boundary between the inner and outer parts of the air turbine.

DESCRIPTION OF PREFERRED EMBODIMENTS

Figure 1:
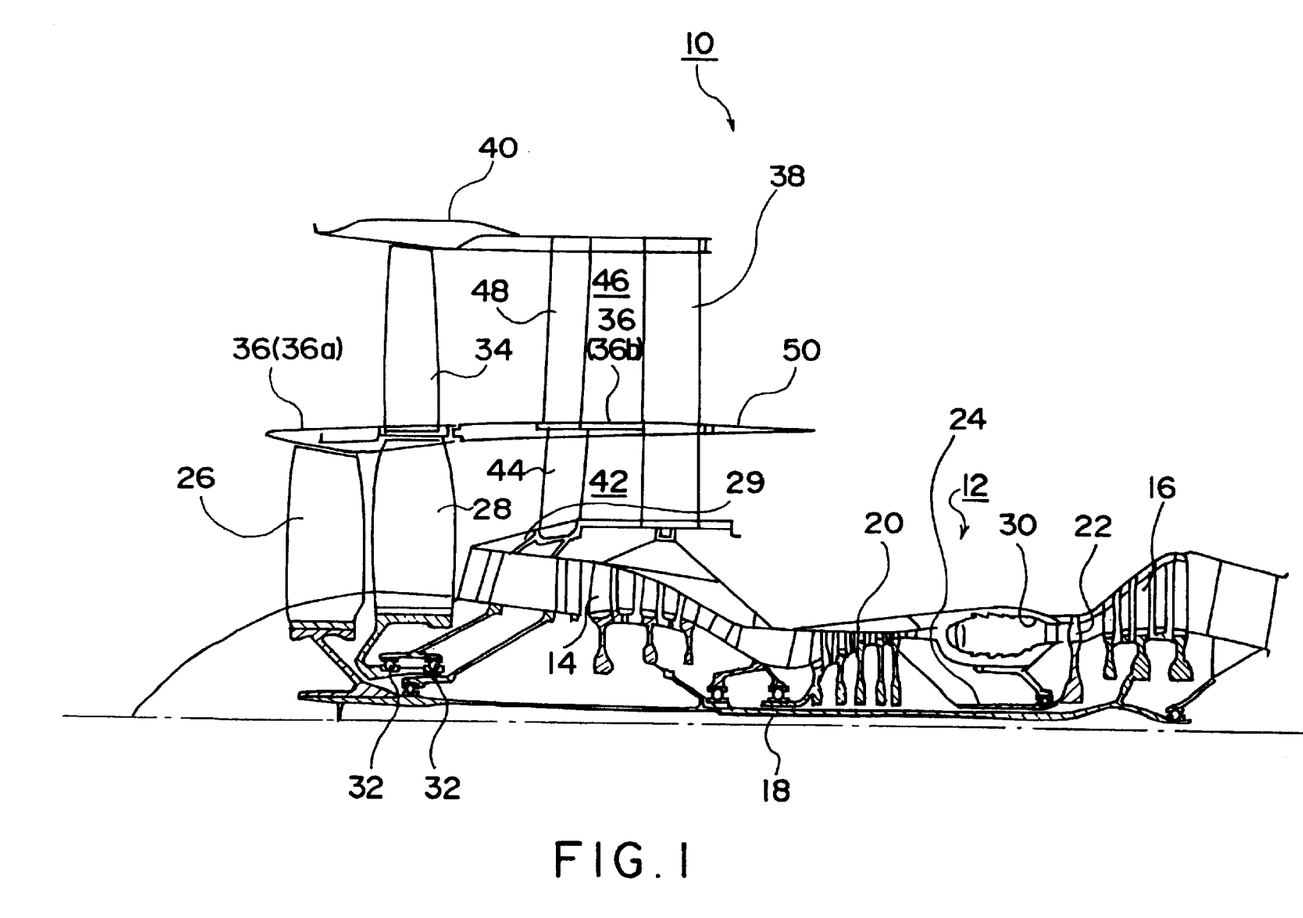
FIG. 1 is a partial cross sectional view showing a turbofan engine according to the first embodiment of the present invention.

Preferred embodiments of the present invention will next be described with reference to the drawings. FIG. 1 schematically shows the structure of a turbofan engine 20 according to the first embodiment. A core engine 12 of a dual shaft type includes an inner shaft 18 connecting a low-pressure compressor 14 and a low-pressure turbine 16, and an outer shaft 24 connecting a high-pressure compressor 20 and a high-pressure turbine 22. The inner shaft 18 extends upstream and has a forward end connected to an impeller 26. The air channeled downstream by the impeller 26 passes through an air turbine 28, described hereafter, and the air inside a first flow splitter 29 is compressed by the low-pressure and high-pressure compressors 14 and 20 to be directed into a combustion chamber 30. Fuel supplied to the inside of the combustion chamber 30 burns therein and the burnt gas rotates the high-pressure and low-pressure turbines 22 and 16. The gas flowing past the low-pressure turbine 16 is ejected from an exhaust nozzle as a jet, thereby producing jet thrust.

The air turbine 28 has an axle supported to the main body by a bearing 32 and is rotatable around the axis of the core engine. The air turbine 28 is rotated by receiving an airflow produced by the impeller 26 of the axial flow type. Thus, the impeller 26 and the air turbine 28 form a fluid coupling. A blade of the air turbine 28 is extended radially and the extended portion forms a fan 34, which rotates integrally with the air turbine 28, producing an airflow. A second flow splitter 36 is located at the boundary between the air turbine 28 and the fan 34 and extends upstream and downstream from the boundary, dividing the airflows outside and inside thereof. A forward part 36a of the second flow splitter is fixed to the air turbine 28 and the fan 34, and rotates therewith. The forward part 36a of the second flow splitter surrounds the outer periphery of the impeller 26 with a small gap therebetween. A rearward part 36b of the second flow splitter is fixed to the core engine 12 by means of a frame strut 38, which further extends radially to be supported by a cowl 40.

The airflow channeled downstream by the impeller 26 rotates the air turbine 28 as described above, and is further channeled downstream, though its energy is diminished. The air flow outside the first flow splitter 29 flows through an inner bypass 42, with a swirling flow being straightened to an axial flow by an inner guide vane 44 to exit downstream. Therefore, the portion of the airflow produced by the impeller 26 but not used for rotating the air turbine directly contributes to producing the propulsion force. Thus, the energy generated by the impeller 26 is efficiently utilized even though the air turbine is relatively inefficient.

Meanwhile, the airflow blown downstream by the fan 34 is channeled through an outer bypass 46, and a swirling flow is straightened to an axial flow by an outer guide vane 48 to be ejected downstream.

Due to the blade profiles and outer diameters of the impeller 26, the air turbine 28, and the fan 34, the rotational speed of the air turbine 28 is reduced relatively to that of the impeller 26. Thus, the impeller 26 and the air turbine 28 function as a speed reducing device for driving the fan 34 with a speed reduced from the rotational speed of the inner shaft 18. Since the fan 34 rotates more slowly than the inner shaft 18, the peripheral speed of the fan 34 can be decreased, so that the fan 34 with a greater outer diameter can be used and turbine efficiency will not be lowered.

The thrust produced by the low-pressure turbine 16 is substantially balanced with that produced by the low-pressure compressor 14 and the impeller 26, whereby the bearing supporting the inner shaft 18 does not need to receive a great thrust load. The air turbine 28 and the fan 34 produce the thrust powers in directions opposite to each other, and therefore the thrust load of the bearing 32 will not be great in value. As a result, there is no need to provide a high capacity thrust bearing, and the increase in weight caused by provision of the speed reducing mechanism can be suppressed to a small value.

At the aft end of the rearward part 36b of the second flow splitter, a variable nozzle 50 is provided for varying the cross sectional area of the outlet of the inner bypass 42. The variable nozzle 50 is so adjusted as to prevent loss due to interference of the airflows from the fan 34 and from the air turbine 28. In other words, it is adjusted so that the speed of the emission flow from the inner bypass 42 attains a value close to that of the emission flow from the outer bypass 46.

Figure 2:
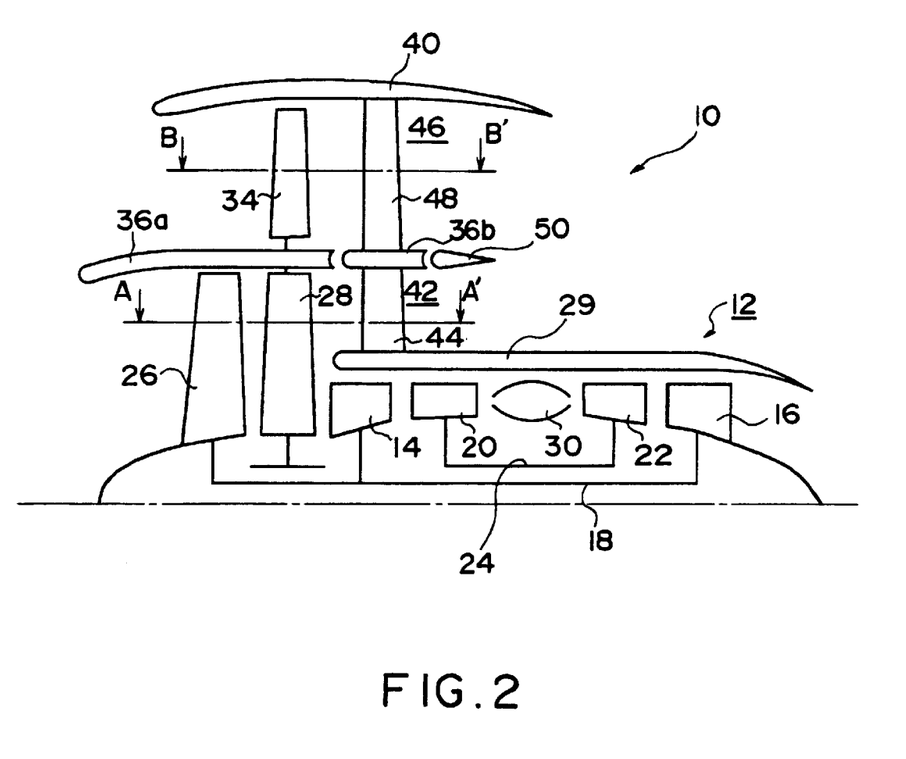
FIG. 2 schematically shows a structure of the embodiment shown in FIG. 1.
Figure 3:
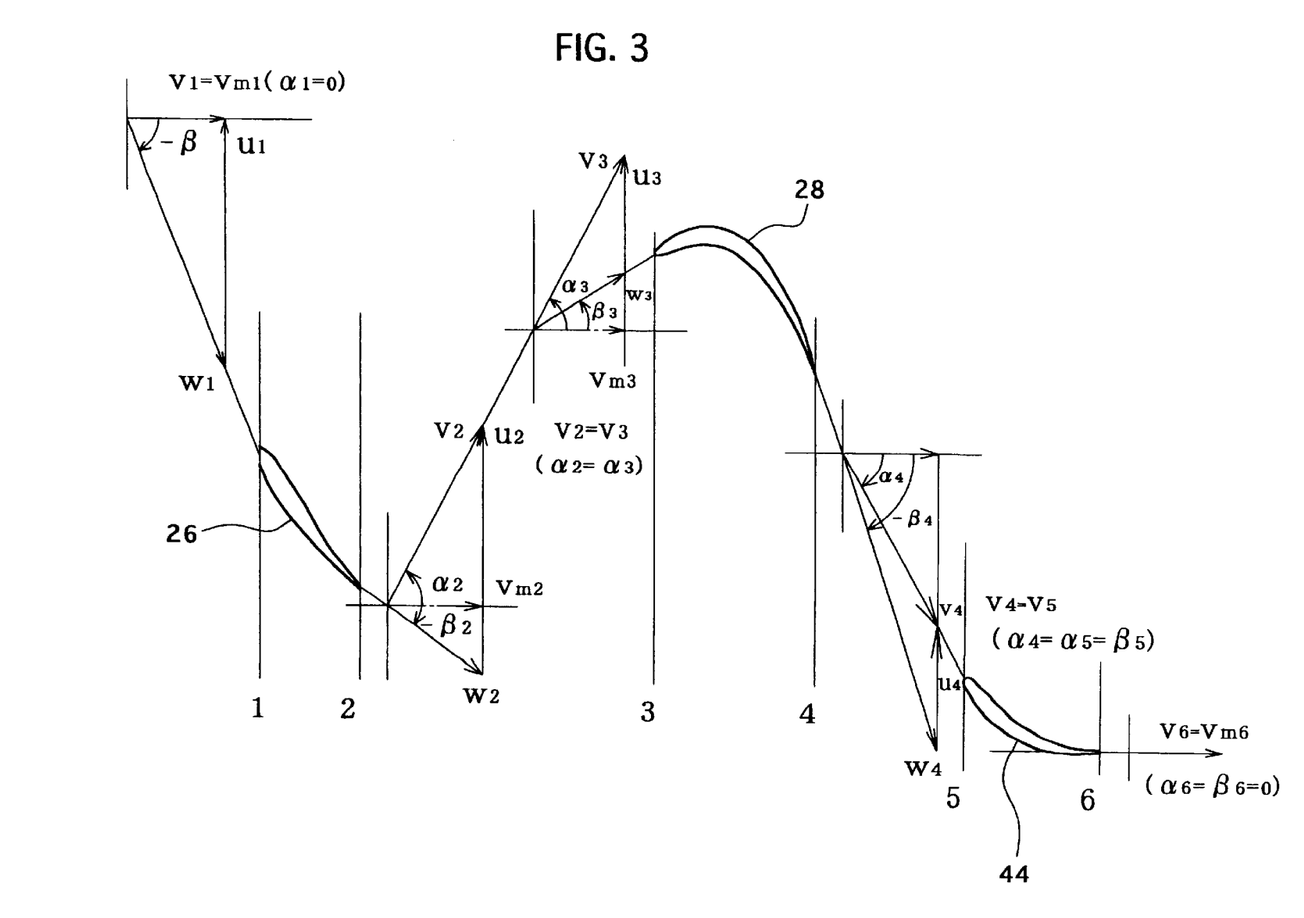
FIGS. 3 and 4 are developments of cross sections of the cylindrical surfaces taken along the lines A-A' and B-B', respectively.
Figure 4:
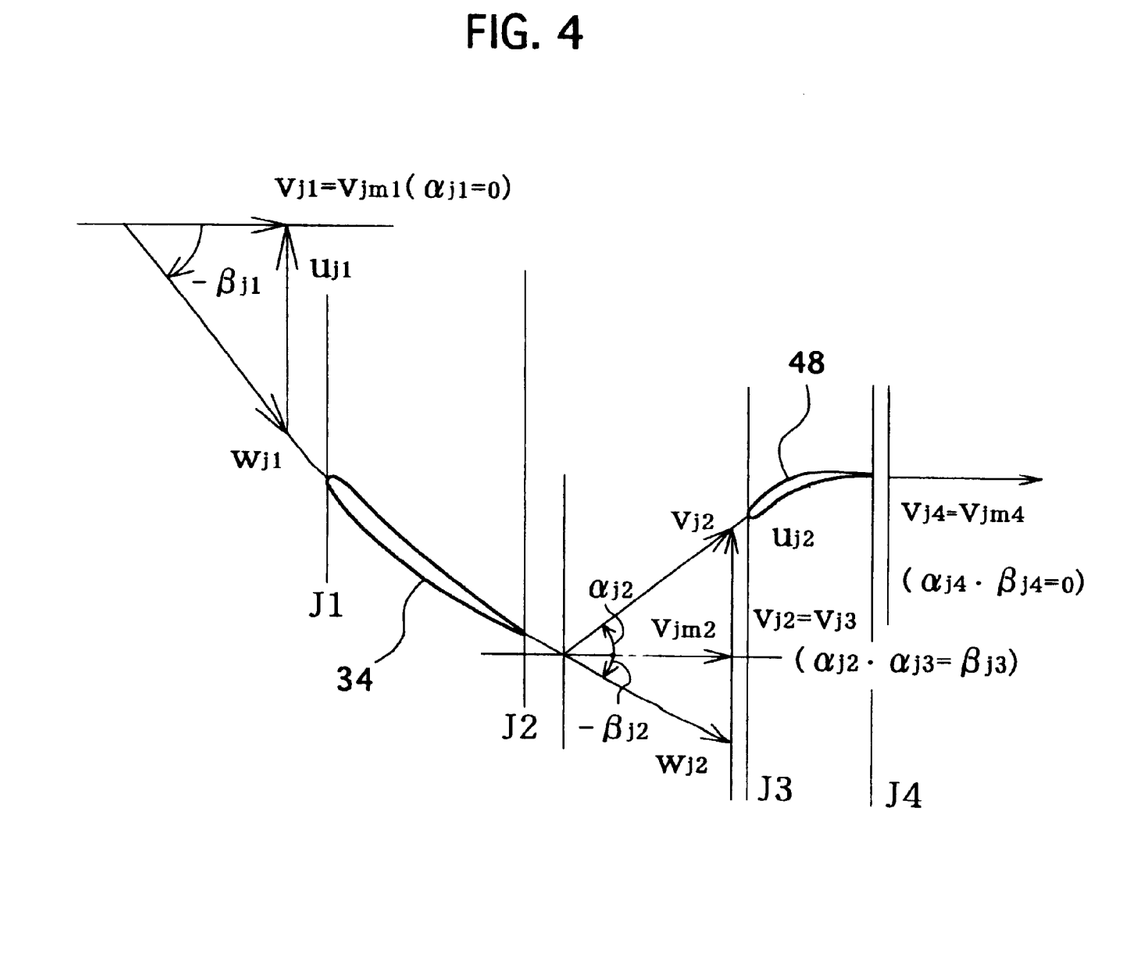

FIG. 2 schematically shows the structure of the turbofan engine 10 shown in FIG. 1. Corresponding components in this figure are labeled with the same numerals as in FIG. 1 and their description will not be repeated. FIG. 3 is a cascade taken along the line A-A' shown in FIG. 2. At this section, blades 26a, 28a of the impeller 26 and the air turbine 28, respectively, and a stationary blade 44 have such profiles as those schematically shown in the figure. FIG. 3 also illustrates triangles of velocities for the fluid stream. Respective elements of the triangle of velocities at the inlet and outlet of the impeller 26 are denoted by indices 1 and 2, respectively. Similarly, respective elements thereof at the inlet and outlet of the air turbine 28 are denoted by indices 3 and 4, and the elements at the inlet and outlet of the stationary blade 44 by indices 5 and 6. As shown, the airflow produced by the blade 26a of the impeller strikes the blade 28a of the air turbine, transmits the energy, and thereafter its direction is changed to the axial direction by the stationary blade 44. FIG. 4 is a cascade taken along the line B-B' shown in FIG. 2. The profiles of the blade 34a of the fan 34 and the stationary blade 44 at this cross section are as those schematically shown in the figure. FIG. 4 also illustrates triangles of velocities for the fluid stream. Respective elements of the triangle of velocities at the inlet and outlet of the fan 34 are denoted by indices j1 and j2, respectively. Similarly, respective elements thereof at the inlet and outlet of the stationary blade 48 are denoted by indices j3 and j4. As shown in this figure, the direction of the airflow produced by the blade 34a of the fan is changed to the axial direction by the stationary blade 48. Due to this function of the stationary blade 48, the swirling component which does not contribute to the thrust power of the engine can be transformed into an axial component contributing to the thrust power, thereby enhancing propeller efficiency of the fan 34.

Figure 5:
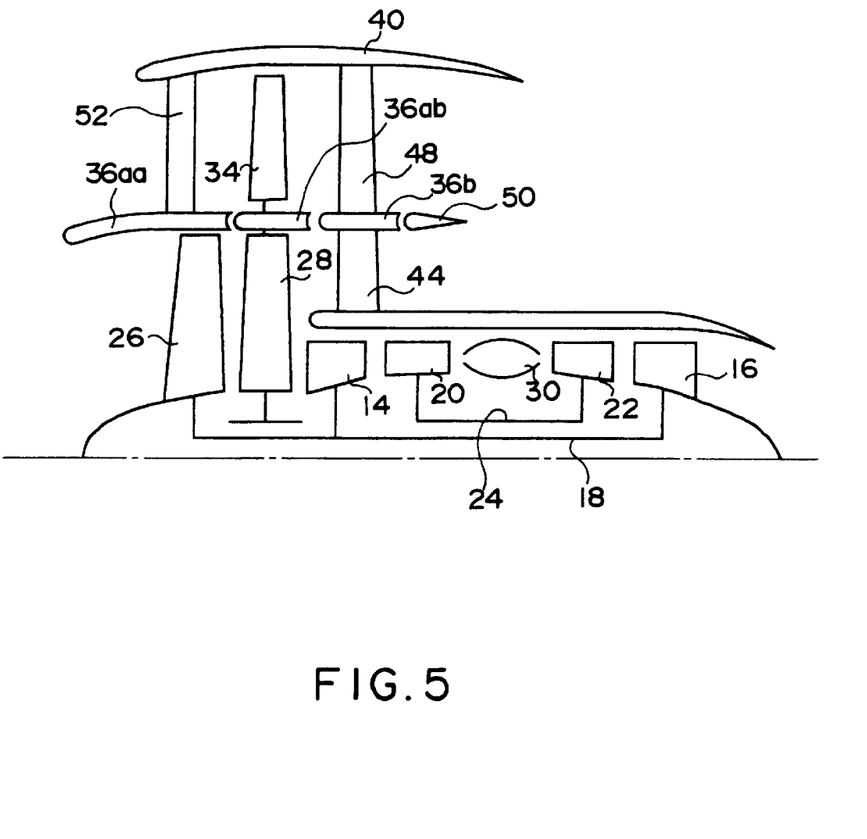
FIG. 5 schematically shows a modification of the first embodiment.

The forward part 36a of the second flow splitter can be divided into a stationary part 36aa and a rotary part 36ab as shown in FIG. 5. The stationary part 36aa is fixedly arranged, supported from the cowl 40 by an auxiliary strut 52. The rotary part 36ab is located at the boundary between the air turbine 28 and the fan 34 and rotates therewith. The outline profile of the stationary part 36aa and the rotary part 36ab combined is the same as that of the forward part 36a of the second splitter shown in FIG. 2, and their functions are the same.

Figure 6:
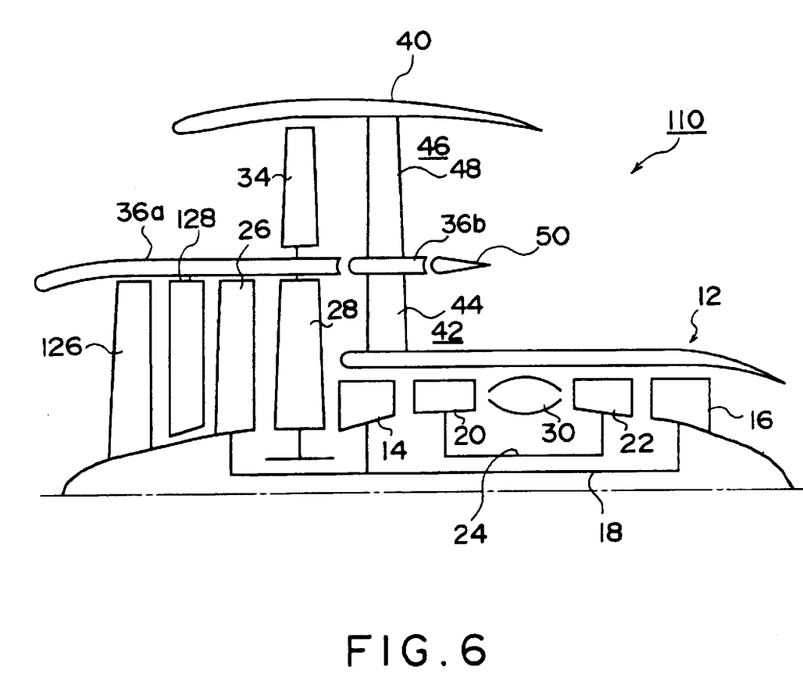
FIGS. 6–13 schematically show structures of the second to ninth embodiments, respectively, according to the present invention.

FIG. 6 schematically shows the structure of a turbofan engine 110 according to the second embodiment of the present invention. In the description of this embodiment, components identical to those in the above-described first embodiment are denoted by identical numerals and their description will not be repeated. A characteristic feature of this embodiment lies in that two pairs of impellers 26 and 126 and air turbines 28 and 128 are provided. More specifically, another set of the impeller 126 and the air turbine 128 are disposed upstream of the speed reducing mechanism formed by the impeller 26 and the air turbine 28 of the first embodiment. The fan 34 is driven and caused to rotate by these two air turbines 28 and 128. By providing two pairs of impellers and air turbines, the outer diameters of the impeller and the air turbine can be reduced. Thus, if the same outer diameter of the fan is used, the cross sectional area of the fan can be increased, contributing to an increase in propulsive force by the fan.

Figure 7:
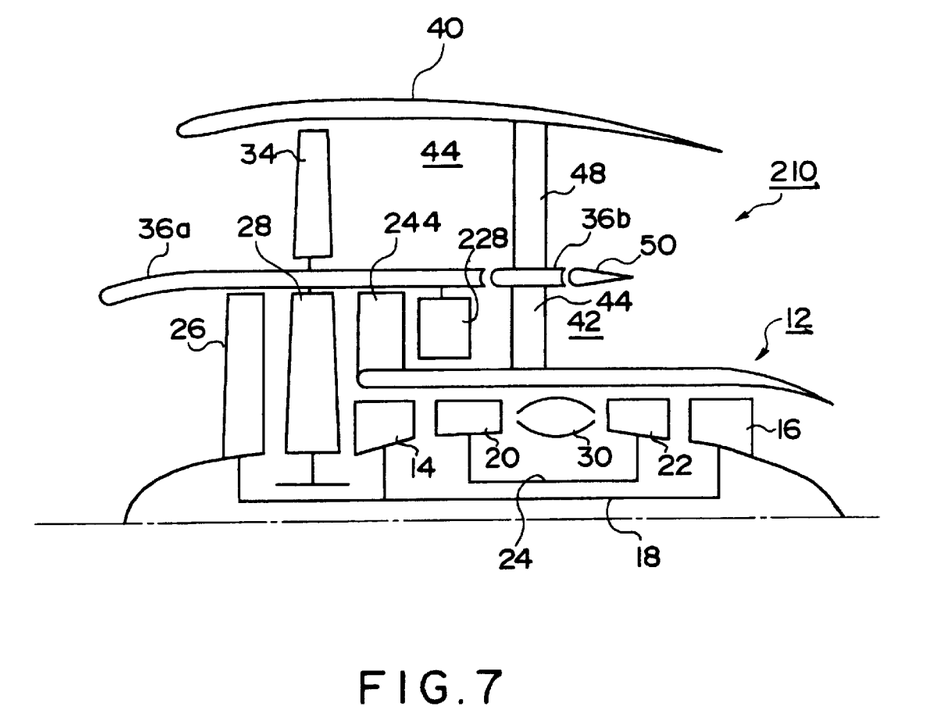

FIG. 7 schematically shows the structure of a turbofan engine 210 according to the third embodiment of the present invention. In this description of the present embodiment, components identical to those described with reference to the first embodiment are denoted by identical numerals and their description will not be repeated. This embodiment is characterized in that two air turbines 28 and 228 are provided as a speed reducing mechanism. More specifically, another air turbine 228 is disposed in the inner bypass 44 downstream of the speed reducing mechanism formed by the impeller 26 and the air turbine 28 in the first embodiment. A stationary blade 244 is also provided for changing the direction of the air discharged from the air turbine 28 upstream thereof and producing a suitable airflow to be supplied toward the air turbine 228 disposed downstream thereof. These two air turbines 28 and 228 drive the fan 34 to cause rotation thereof. Such provision of two air turbines allows reduction in outer diameter of the impellers and the air turbines and further in the resulting diameter of the engine as a whole. In addition, a higher torque transmission efficiency can be obtained, offering a wider range of speed reduction ratios to choose from. Since the rotational speed of the impeller can be increased, the rotational speed of the turbine can also be increased accordingly, thereby raising the turbine efficiency.

Figure 8:
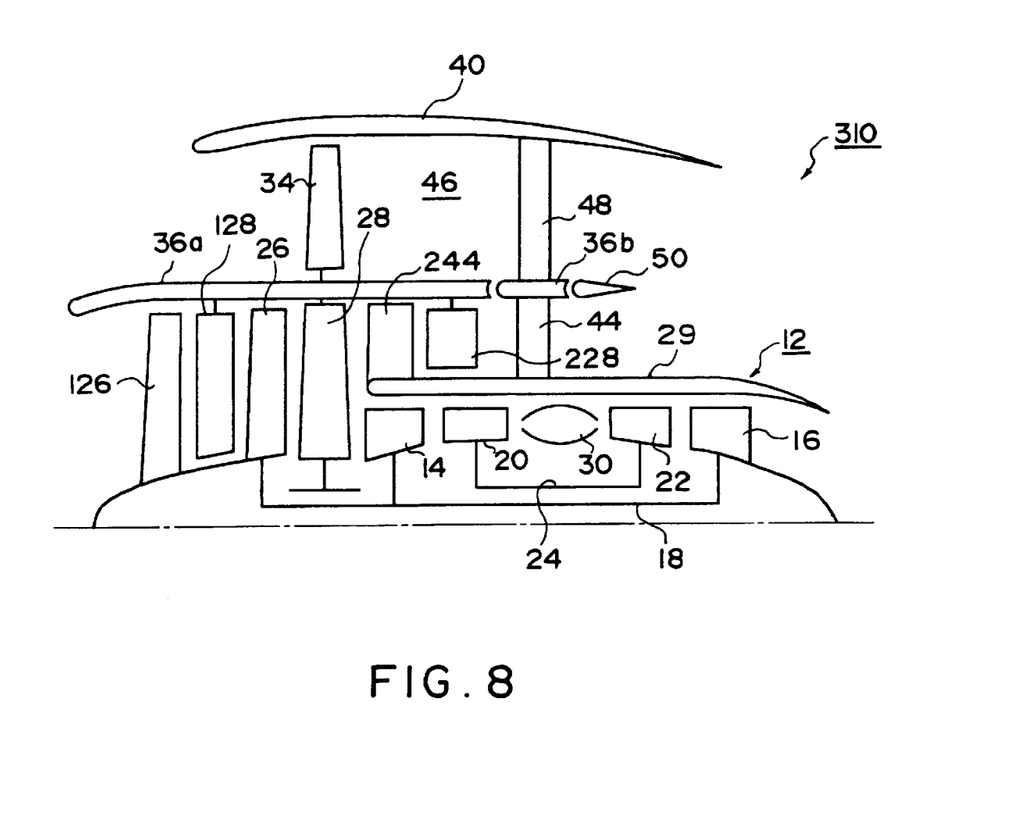

FIG. 8 schematically shows the structure of a turbofan engine 310 according to the fourth embodiment of the present invention. In describing this embodiment, components identical to those described in connection with the first and second embodiments are labeled with identical numerals and their description will not be repeated. This embodiment is characterized in that the impellers 26, 126 and the air turbines 28, 128, and 228 are provided as a speed reducing mechanism. In other words, the structure of this embodiment is a combination of those of the second and third embodiments. The fan 34 is rotationally driven by these three turbines 28, 128, and 228. By providing the three air turbines and the two impellers, a further reduction in outer diameters of the impellers and the air turbines can be achieved. Therefore, with the same outer diameter of the fan, a greater cross sectional area of the fan can be obtained, allowing a further increase in propulsion force by the fan.

Figure 9:
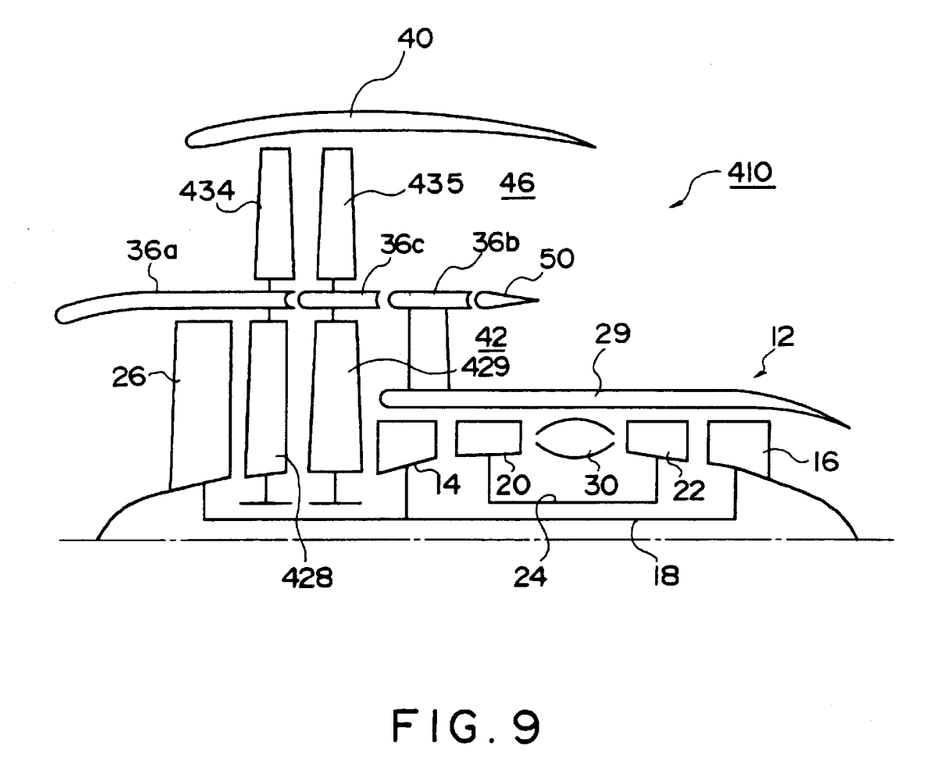

FIG. 9 schematically shows the structure of a turbofan engine 410 according to the fifth embodiment of the present invention. In description of this embodiment as well, components identical to those already described in connection with the first embodiment are indicated by identical numerals and their description will not be repeated. The characteristic feature of this embodiment lies in the use of contra-rotating fans obtained by combining a main fan 434 and a counter fan 435. The main fan 434 is disposed outside a main air turbine 428 which receives the airflow produced by the impeller 26, integrally therewith, and is rotated by the turbine 428. The airflow channeled past the main air turbine 428 rotates a counter air turbine 429 in a direction opposite to the main air turbine 428. The counter fan 435 is disposed outside the counter air turbine 429 integrally therewith, and is therefore rotated in a direction opposite to the main fan 434. Although the airflow generated by the fan 434 includes swirling component, the counter fan changes the direction of this component to axial component, thereby increasing propeller efficiency of the fan. According to this embodiment, the second flow splitter includes a forward part 36a rotating with the main fan 434, and an intermediate part 36c rotating with the counter fan 435.

Figure 10:
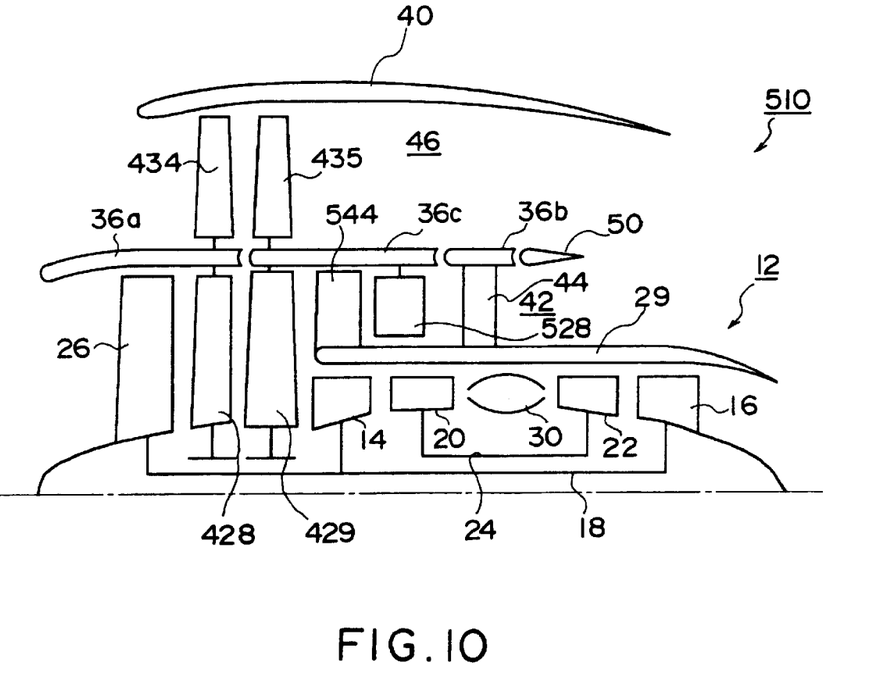

FIG. 10 schematically shows the structure of a turbofan engine 510 according to the sixth embodiment of the present invention. The components described in connection with the above embodiments are denoted by the same numerals in description of this embodiment as well, and description thereof will not be repeated. This embodiment is a combination of the fifth embodiment where contra-rotating fans are employed with the air turbine 228 in the third embodiment shown in FIG. 7. More specifically, a counter air turbine 528 is disposed in the inner bypass 42, which, together with the counter air turbine 429, drive the counter fan 435 to cause rotation thereof. It is apparent from the above that the counter air turbine 528 rotates in a direction opposite to the above-described air turbine 228. A stationary blade 544 is also disposed between these two counter air turbines 429 and 528, so that the airflow from the counter air turbine 429 efficiently strikes the counter air turbine 528. Such increase in the number of counter air turbines allows an increase in torque for rotating the counter fans.

Figure 11:
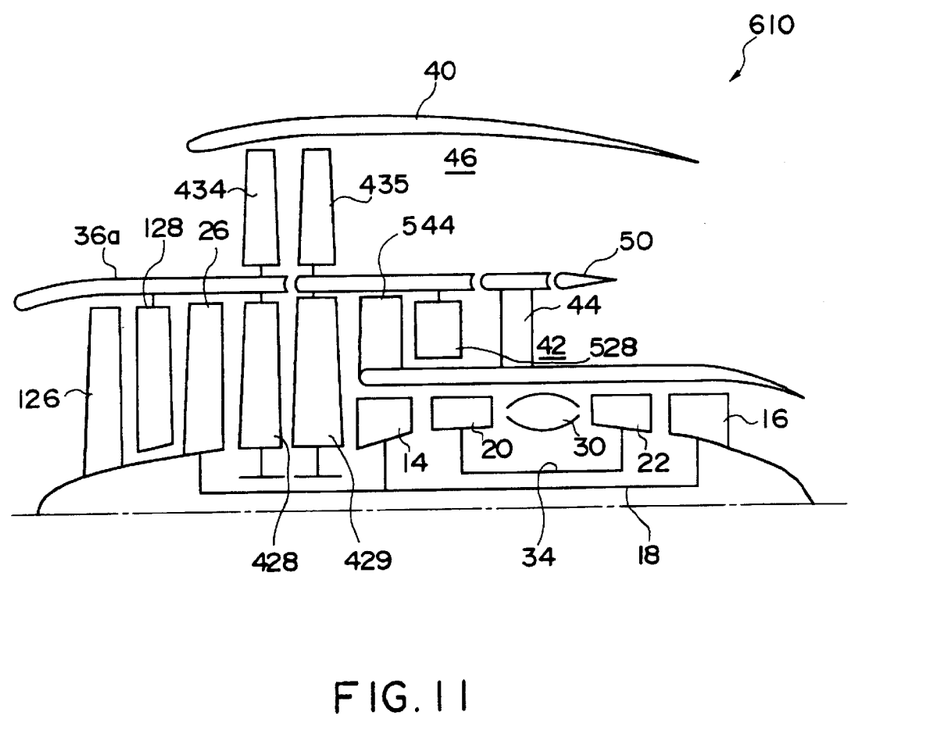

FIG. 11 schematically shows the structure of a turbofan engine 610 according to the seventh embodiment of the present invention. Components already described in connection with the above-described embodiments are also denoted by the same numerals in this embodiment, and their description will not be repeated. The engine of this embodiment is a combination of the engine of the sixth embodiment with the impeller 126 and the air turbine 128 of the second embodiment shown in FIG. 6. The main fan 434 is driven by two main air turbines 128 and 428 to increase the torque. Similarly to the second and other embodiments, the outer diameter of the second flow splitter can be reduced by providing a plurality of air turbines, contributing to an increase in propulsion force by the fan.

Figure 12:
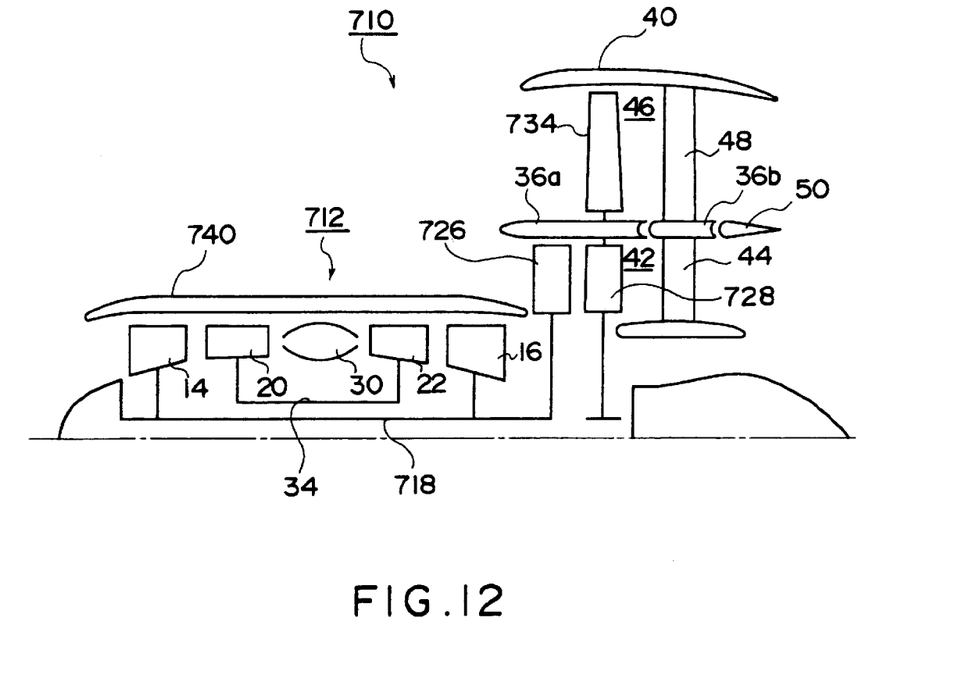

FIG. 12 schematically shows the structure of a turbofan engine 710 according to the eighth embodiment of the present invention. In the description of this embodiment as well, components described in connection with the above embodiments are denoted by the same numerals, and their description will not be repeated. According to this embodiment, the fan 734 and a mechanism for transmitting the rotation of the output shaft of the core engine at a reduced speed to a fan 734 are disposed downstream of a core engine 712. The output of the core engine is directed downstream by an inner shaft 718 to drive an impeller 726. The airflow produced by the impeller 726 rotates an air turbine 728, and is channeled through the inner bypass 42 to be ejected downstream. Such ejection flow generates a part of propulsion force. Rotation of the air turbine 728 causes the fan 734 provided integrally at the outside thereof to rotate. The fan 734 produces an airflow in a rearward direction, providing a major part of the propulsion force. The rotational speed of the fan 734 can be determined by such factors as blade profiles and lengths of the impeller 726, the air turbine 728, and the fan 734. As in the above-described embodiments, the rotational speed of the fan 734 is slower than that of the impeller 726, and, therefore, that of the inner shaft 718, so that the peripheral speed of the fan 734 can be suppressed.

Figure 13:
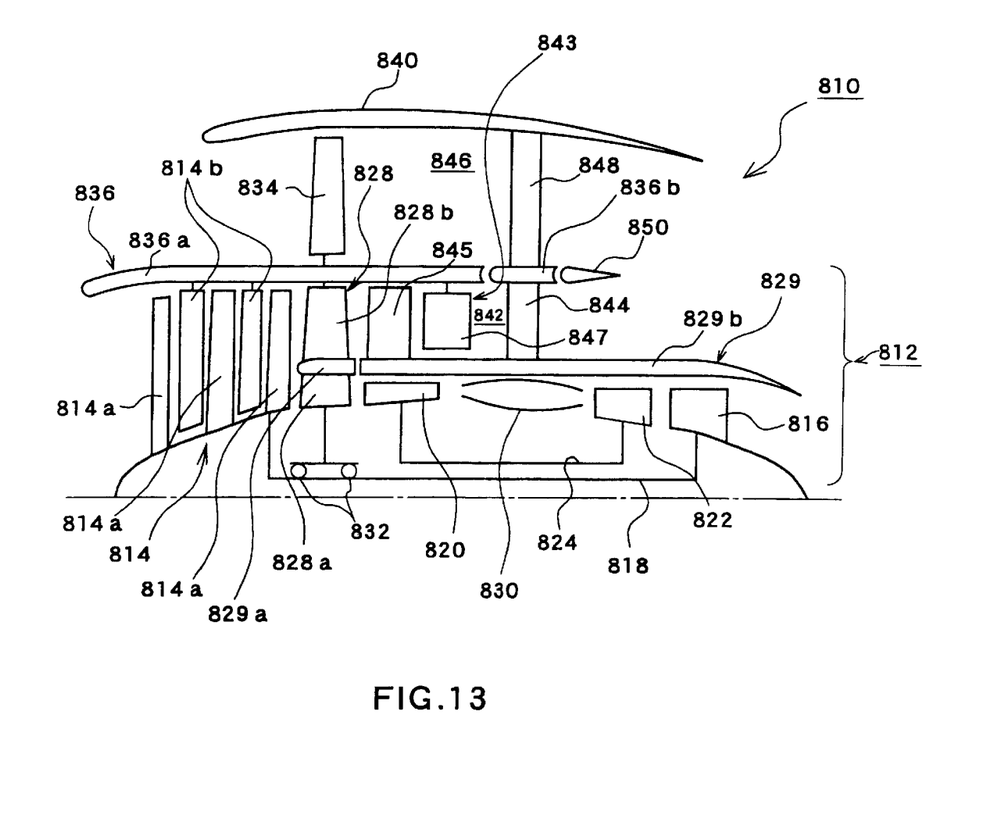

FIG. 13 schematically shows the structure of a turbofan engine 810 according to the ninth embodiment of the present invention. A core engine 812 of a dual shaft type includes an inner shaft 818 connecting a low-pressure compressor 814 and a low-pressure turbine 816, and an outer shaft 824 connecting a high-pressure compressor 820 and a high-pressure turbine 822. An air turbine 828 is provided downstream from the low-pressure compressor 814, and rotated by the airflow produced by the low-pressure compressor 814. The air turbine 828 includes an air turbine splitter 829a for dividing an inner part 828a and an outer part 828b of the air turbine 828. A main splitter 829b is provided downstream from the air turbine splitter 829a. These two splitters 829a and 829b constitute an inner splitter 829.

The inner part 828a of the air turbine supports the outer part 828b, and has a blade profile that is in line with the airflow discharged from the low-pressure compressor 810 and that does not impede the airflow channeled therethrough. The airflow past the air turbine inner part 828a flows through the inside of the inner splitter 829. The airflow is first directed to the high-pressure compressor 820, further compressed therein, and channeled into a combustion chamber 830. Fuel supplied into the combustion chamber 830 burns therein and the burnt gas rotates the high-pressure and low-pressure turbines 822 and 816. The gas flowing past the low-pressure turbine 816 is ejected from an exhaust nozzle as a jet, thereby producing jet thrust. The inner part 828a of the air turbine may have a blade profile such that the air from the low-pressure compressor is further compressed.

The air turbine 828 is supported by a bearing 832 to be rotatable around the axis of the core engine 812. A fan 834 is provided outside the air turbine 828 and rotates integrally therewith. A forward part 836a of an outer flow splitter 836 is provided at the boundary between the air turbine 828 and the fan 834 and extends upstream and downstream from the boundary, dividing the airflows outside and inside thereof. A rearward part 836b of the outer flow splitter 836 is fixed to the inner flow splitter 829 by a structure (not shown) corresponding to the frame strut 38 of the embodiment shown in FIG. 1. The frame strut further extends in a radial direction to support a cowl 840.

The low-pressure compressor 814 includes blades 814a provided in a plurality of stages and rotationally driven by the inner shaft 818. A passive blade 814b is provided for each gap between the stages of the blades 814a, and rotates integrally with the forward part 836a of the outer flow splitter. That is, the passive blade 814b rotates integrally with the air turbine 828.

The airflow past the outer part 828b of the air turbine is channeled through a core bypass 842 formed by the annular space between the outer and inner flow splitters 836 and 829. An expansion turbine 843 is disposed in the course of the airflow, i.e. the space between the inner and outer flow splitters 829 and 836. The expansion turbine 843 includes a stationary blade 845 for changing the airflow discharged from the outer part 828b of the turbine into a suitable airflow to be supplied downstream thereof, and an expansion turbine blade 847 receiving the airflow from the stationary blade 845. The expansion turbine blade 847 is supported by the forward part 836a of the outer flow splitter, and rotates integrally therewith. The airflow channeled past the expansion turbine 843 is ejected downstream with a swirling flow being straightened to an axial flow by an inner guide blade 844.

The fan 834 is rotated by the passive blade 814b of the low-pressure compressor rotating integrally with the outer flow splitter 836, the air turbine 828, and the expansion turbine blade 847. The fan 834 forms an airflow in a main bypass 846 created by the annular space between the outer flow splitter 836 and the cowl 840. A swirling flow is straightened to an axial flow by an outer guide blade 848 before the airflow is further discharged downstream. At the aft end of the outer splitter 836, a variable nozzle 850 is provided for varying the cross sectional area of the outlet of the core bypass 842. The variable nozzle 850 is so adjusted as to control the flow rate of the air discharged from the expansion turbine 843.

By properly setting such factors as blade profiles of the blade 814a and the passive blade 814b of the low-pressure compressor, the air turbine 828, the expansion turbine 847, and the fan 834, the rotational speed of the fan 834 is reduced relative to the inner shaft 818, contributing to a reduction in peripheral speed of the fan 834, whereby a fan with a greater outer diameter can be employed.

As the peripheral speed of the fan 834 can be decreased, the rotational speed of the low-pressure compressor can conversely be increased. As a result, a reduction in number of stages of the low-pressure compressors and the low-pressure turbines can be achieved, so that a simplified structure can be implemented for these components. In addition, such higher rotational speed leads to a higher efficiency of the low-pressure compressor and the low-pressure turbine.

What is claimed is:

1. A turbofan engine, comprising:

a high-pressure turbine rotated by combusted gas discharged from a combustion chamber;

a low-pressure turbine rotated by combusted gas discharged from said high-pressure turbine;

a high-pressure compressor having a first shaft common with, and driven by, said high-pressure turbine for supplying compressed air into said combustion chamber;

a low-pressure compressor having a second shaft common with said low-pressure turbine for compressing air supplied from the upstream of said engine to be discharged downstream;

an air turbine receiving an airflow discharged from said low-pressure compressor to cause rotation, at least a portion of an airflow channeled past said air turbine being directed to said high-pressure compressor;

a flow splitter supported to said air turbine rotatably around an axis of said engine; and a fan disposed on an outer periphery side of said flow splitter for rotating integrally with said air turbine to thereby produce propulsive force.

2. The turbofan engine according to claim 1, wherein said low-pressure compressor includes a blade rotating integrally with said second shaft, and a passive blade rotating integrally with said flow splitter.

3. The turbofan engine according to claim 1, further comprising:

an expansion turbine for receiving a portion of the airflow past said air turbine to rotate said flow splitter.

4. The turbofan engine according to claim 3, wherein an airflow passing through an inner part of said air turbine is directed to said high-pressure compressor, an airflow passing through an outer part thereof is directed to said expansion turbine, and an air turbine splitter is disposed at the boundary between said inner part and said outer part.

* * * * *